United States Patent
Sayyed et al.

(10) Patent No.: US 11,922,173 B2
(45) Date of Patent: Mar. 5, 2024

(54) SYSTEMS AND METHODS FOR AUTOMATING PRE-BOOT SOFT KEYBOARD BEHAVIOR BASED ON SYSTEM CONTEXT

(71) Applicant: Dell Products L.P., Round Rock, TX (US)

(72) Inventors: Ibrahim Sayyed, Georgetown, TX (US); Adolfo Montero, Pflugerville, TX (US); Jagadish Babu Jonnada, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 17/320,675

(22) Filed: May 14, 2021

(65) Prior Publication Data

US 2022/0365790 A1 Nov. 17, 2022

(51) Int. Cl.
*G06F 9/4401* (2018.01)
*G06F 3/04817* (2022.01)

(52) U.S. Cl.
CPC ........ *G06F 9/4411* (2013.01); *G06F 3/04817* (2013.01)

(58) Field of Classification Search
None
See application file for complete search history.

(56) References Cited

U.S. PATENT DOCUMENTS

| | | | | |
|---|---|---|---|---|
| 6,741,267 B1* | 5/2004 | Leperen | ............... | G06F 3/04886 345/173 |
| 2003/0107600 A1* | 6/2003 | Kwong | ................... | G06F 21/36 715/764 |
| 2006/0034043 A1* | 2/2006 | Hisano | .................. | G06F 1/1679 361/679.04 |
| 2011/0072511 A1* | 3/2011 | Gillespie | ................. | G06F 21/31 726/19 |
| 2021/0271386 A1* | 9/2021 | Heo | ..................... | G06F 3/04895 |

\* cited by examiner

*Primary Examiner* — Farley Abad
*Assistant Examiner* — Dayton Lewis-Taylor
(74) *Attorney, Agent, or Firm* — Jackson Walker L.L.P.

(57) ABSTRACT

An information handling system may include a processor, a display device communicatively coupled to the processor, and a basic input/output system (BIOS) communicatively coupled to the processor and configured to cause the processor to, during a pre-boot environment of the information handling system, collect contextual information regarding the information handling system, based on the contextual information, determine whether to enable soft keyboard functionality, and responsive to a determination to enable soft keyboard functionality, cause display of soft keyboard functionality to the display device.

18 Claims, 5 Drawing Sheets

SYSTEMS AND METHODS FOR AUTOMATING PRE-BOOT SOFT KEYBOARD BEHAVIOR BASED ON SYSTEM CONTEXT

TECHNICAL FIELD

The present disclosure relates in general to information handling systems, and more specifically to systems and methods for automating pre-boot soft keyboard behavior on an information handling system based on system context.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In existing information handling systems, in a tablet mode of such information handling systems, a soft keyboard may be displayed to a display of the information handling system to enable a user to enter data and commands. However, there may be other instances in which it is useful for a user to have the ability to enter data and/or commands via a soft keyboard.

SUMMARY

In accordance with the teachings of the present disclosure, the disadvantages and problems associated with existing information handling systems may be reduced or eliminated.

In accordance with embodiments of the present disclosure, an information handling system may include a processor, a display device communicatively coupled to the processor, and a basic input/output system (BIOS) communicatively coupled to the processor and configured to cause the processor to, during a pre-boot environment of the information handling system, collect contextual information regarding the information handling system; based on the contextual information, determine whether to enable soft keyboard functionality; and responsive to a determination to enable soft keyboard functionality, cause display of soft keyboard functionality to the display device.

In accordance with these and other embodiments of the present disclosure, a method may include, in a basic input/output system (BIOS) of an information handling system during a pre-boot environment of the information handling system, collecting contextual information regarding the information handling system; based on the contextual information, determining whether to enable soft keyboard functionality; and responsive to a determination to enable soft keyboard functionality, causing display of soft keyboard functionality to a display device of the information handling system.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system (BIOS) of an information handling system during a pre-boot environment of the information handling system: collect contextual information regarding the information handling system; based on the contextual information, determine whether to enable soft keyboard functionality; and responsive to a determination to enable soft keyboard functionality, cause display of soft keyboard functionality to a display device of the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

Figure 1:
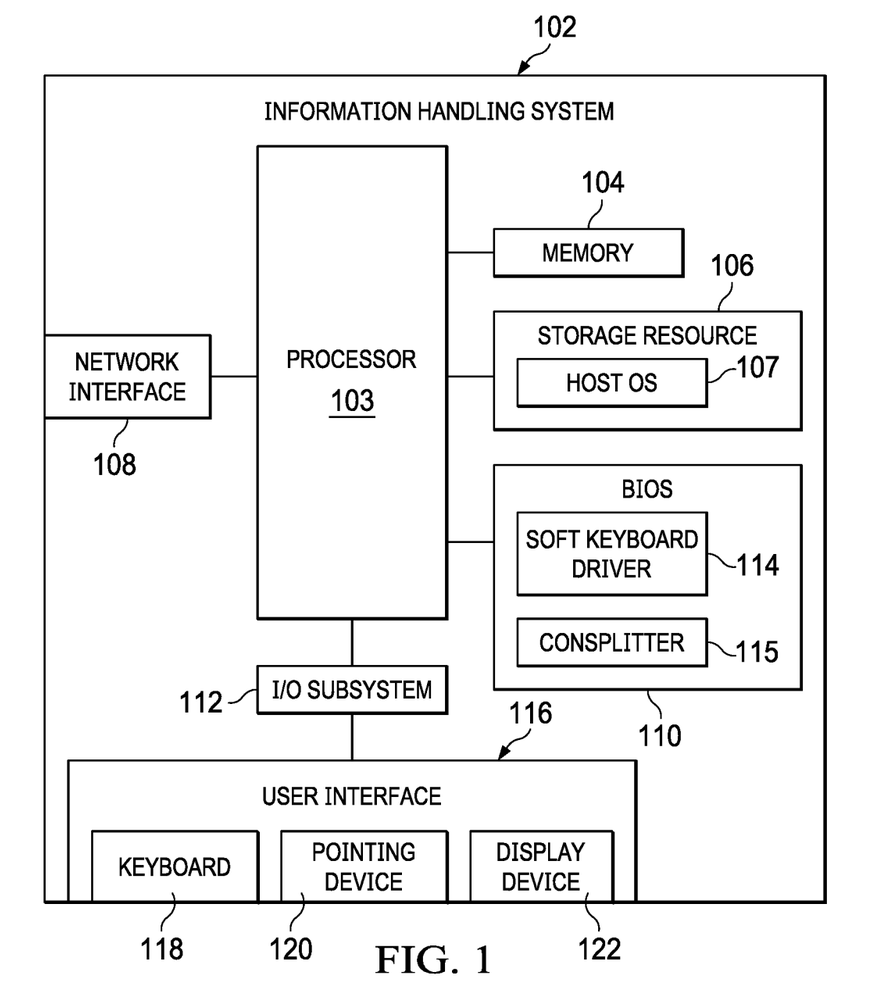
FIG. 1 illustrates a block diagram of an example information handling system, in accordance with embodiments of the present disclosure.

FIG. 1 illustrates a block diagram of an example information handling system 102, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, an input/output (I/O) subsystem 112 communicatively coupled to processor 103, and a user interface 116 communicatively coupled to I/O subsystem 112.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. In some embodiments, storage resource 106 may reside internal to a chassis or other enclosure comprising information handling system 102 and not be readily accessible without opening such chassis or other enclosure. In other embodiments, storage resource 106 may reside internal to a chassis or other enclosure comprising information handling system 102. As shown in FIG. 1, storage resource 106 may have stored thereon a host operating system (OS) 107.

Host OS 107 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by host OS 107. Active portions of host OS 107 may be transferred from storage resource 106 to memory 104 for execution by processor 103.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC." Although not shown in FIG. 1, network interface 108 may be communicatively coupled via a network to a provisioning server from which information handling system 102 may download software and firmware components of information handling system 102, including without limitation an image for host OS 107.

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102.

As shown in FIG. 1, BIOS 110 may implement a soft keyboard driver 114. As described in greater detail below, soft keyboard driver 114 may be configured to, in a pre-boot environment of information handling system 102, analyze system context of information handling system 102 to determine whether to enable a soft keyboard to be displayed to display device 122, and (if the system context dictates) enable soft keyboard functionality on display device 122, either by displaying an icon to display device 122 to allow a user to enable a soft keyboard by interacting with the icon or by displaying the soft keyboard to display device 122.

Figure 5:
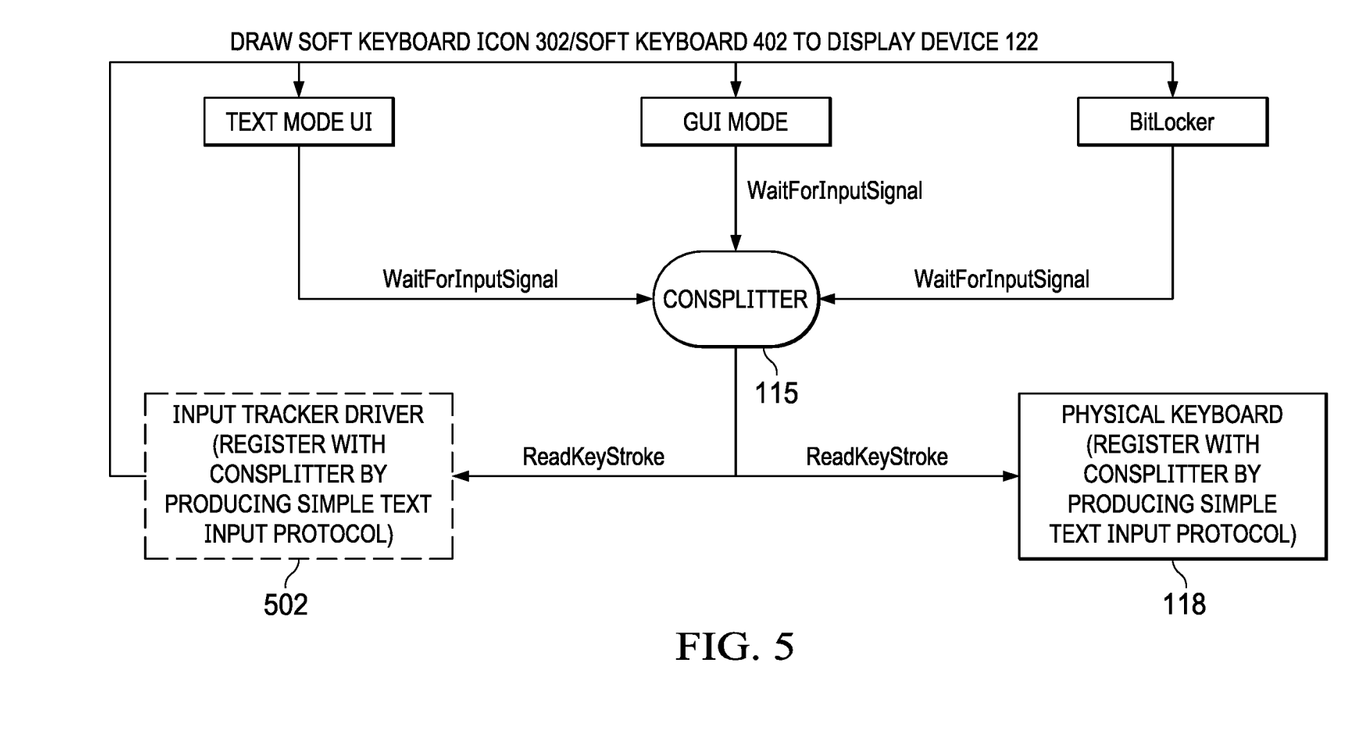
FIG. 5 illustrates a flow diagram demonstrating functionality of a consplitter driver, in accordance with embodiments of the present disclosure.

As also shown in FIG. 1, BIOS 110 may implement a console splitter or "consplitter" driver 115. Consplitter driver 115 may comprise a program of instructions configured to handle user I/O interactions within information handling system 102 during a pre-boot phase of information handling system 102, including outputting information to display device 122 and/or receiving information from user interface 116. In operation, as shown in FIG. 5, one or more front end applications of information handling system 102 configured to receive user I/O information (e.g., Text Mode UI, GUI Mode, BitLocker, etc.) may register with consplitter driver 115 to receiver such input. In operation, consplitter driver 115 may be configured to collect some contextual information (e.g., during step 208 of method 200) by monitoring parameters of user interface 116, including interactions with pointing device 120 or keyboard 118) that may be used to determine whether to invoke soft keyboard driver 114. For example, in the absence of a physical keyboard 118, consplitter driver 115 may implement or cause the execution of an input tracker driver 502 that may register with consplitter driver 115 to read keystrokes from a soft keyboard and may draw a soft keyboard to display device 122, as described in greater detail below.

I/O subsystem 112 may comprise any suitable system, device, or apparatus generally operable to receive and transmit data to or from or within information handling system 102. I/O subsystem 112 may represent, for example, any one or more of a variety of communication interfaces, graphics interfaces, video interfaces, user input interfaces, and peripheral interfaces.

User interface 116 may comprise any instrumentality or aggregation of instrumentalities by which a user may interact with information handling system 102. For example, user interface 116 may permit a user to input data and/or instructions into information handling system 102 (e.g., via a keyboard 118, a pointing device 120, and/or other suitable component), and/or otherwise manipulate information handling system 102 and its associated components. User interface 116 may also permit information handling system 102 to communicate data to a user, e.g., by way of a display device 122. In some embodiments, display device 122 may include a touchscreen display which may enable user input via display device 122.

Figure 2:
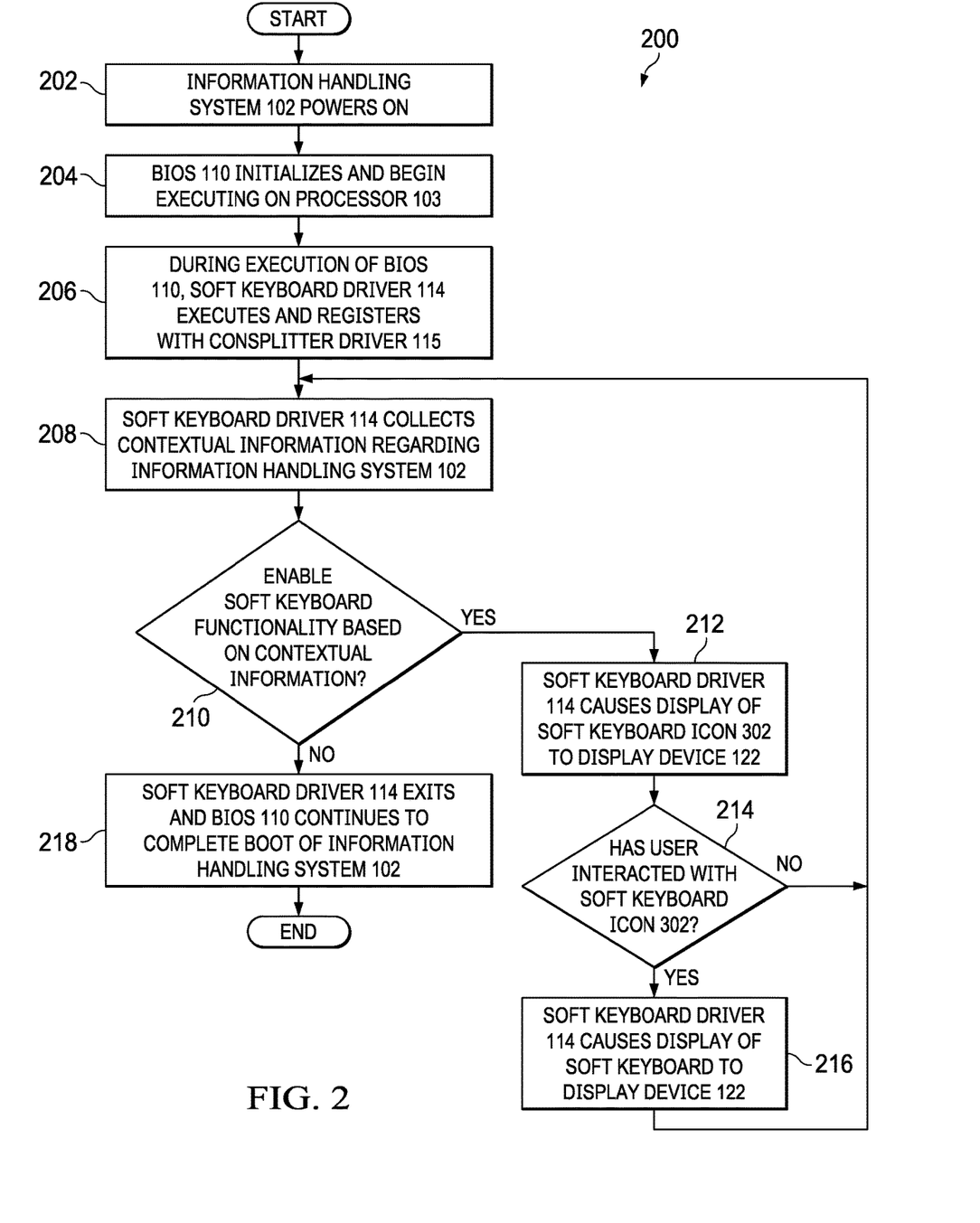
FIG. 2 illustrates a flow chart of an example method for automating pre-boot soft keyboard behavior based on system context, in accordance with embodiments of the present disclosure.

FIG. 2 illustrates a flow chart of an example method 200 for automating pre-boot soft keyboard behavior based on system context, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, information handling system 102 may power on. At step 204, BIOS 110 may initialize and begin executing on processor 103. At step 206, during execution of BIOS 110, soft keyboard driver 114 may execute.

At step 208, soft keyboard driver 114 may collect contextual information regarding information handling system 102. Such contextual information may include any suitable parameters which may inform soft keyboard driver 114 whether or not to enable soft keyboard functionality on display device 122. For example, such contextual information may include whether a physical keyboard 118 is communicatively coupled to I/O subsystem 112. As another example, such contextual information may include whether any BIOS I/O errors have been detected, which may indicate an inoperability of any physical keyboard 118 which is coupled to I/O subsystem 112. As a further example, such contextual information may include whether a process executing on processor 103 is presently seeking user input, whether through a user display prompt, seeking user entry of a hot key or other keystroke, or otherwise. As an additional example, such contextual information may include whether information handling system 102 has experienced a boot failure during a recent boot attempt, as such boot failures may indicate a need to execute a diagnostics mode, configuration mode, and/or other similar mode of BIOS 110. As another example, such contextual information may include whether user presence detection logic of information handling system 102 detects the presence of a user (e.g., any user or an authorized user of information handling system 102). Although systems and methods for implementing user presence detection is beyond the scope of this disclosure, systems and methods for user presence detection that may be used to provide contextual information to soft keyboard driver 114 herein may be described in U.S. patent application Ser. No. 17/009,232 filed Sep. 1, 2020, and incorporated by reference herein in its entirety.

At step 210, soft keyboard driver 114 may determine whether to enable soft keyboard functionality based on the contextual information. If soft keyboard driver 114 determines to enable soft keyboard functionality, method 200 may proceed to step 212. Otherwise, method 200 may proceed to step 218.

Figure 3:
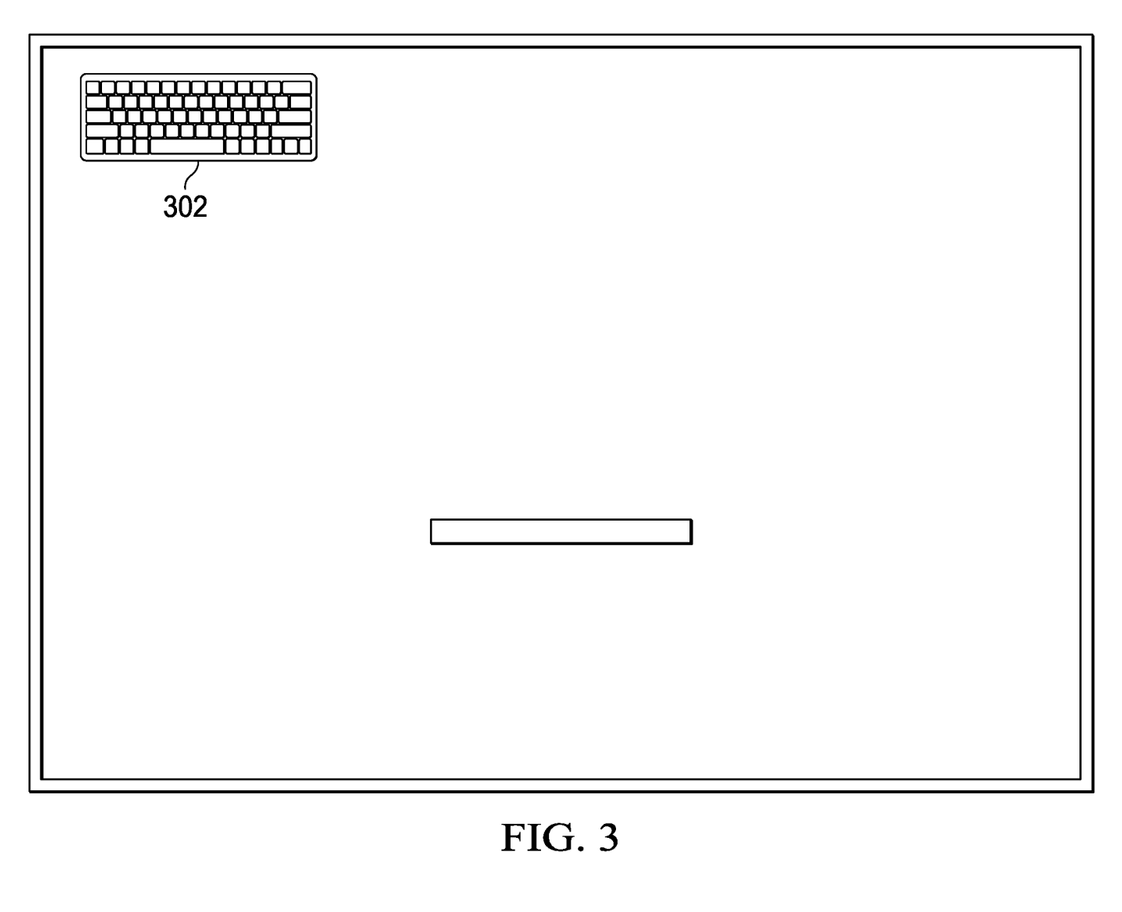
FIG. 3 illustrates display of a soft keyboard icon, in accordance with embodiments of the present disclosure.

At step 212, soft keyboard driver 114 may cause display of a soft keyboard icon to display device 122. For example, as shown in FIG. 3, soft keyboard driver 114 may cause display of soft keyboard icon 302 as an overlay to graphical or alphanumerical information displayed to display device 122.

At step 214, soft keyboard driver 114 may determine whether a user has interacted with soft keyboard icon 302 to indicate the user's desire to input information via a soft keyboard. If soft keyboard driver 114 determines that the user has interacted with soft keyboard icon 302, method 200 may proceed to step 216. Otherwise, method 200 may proceed again to step 208.

Figure 4:
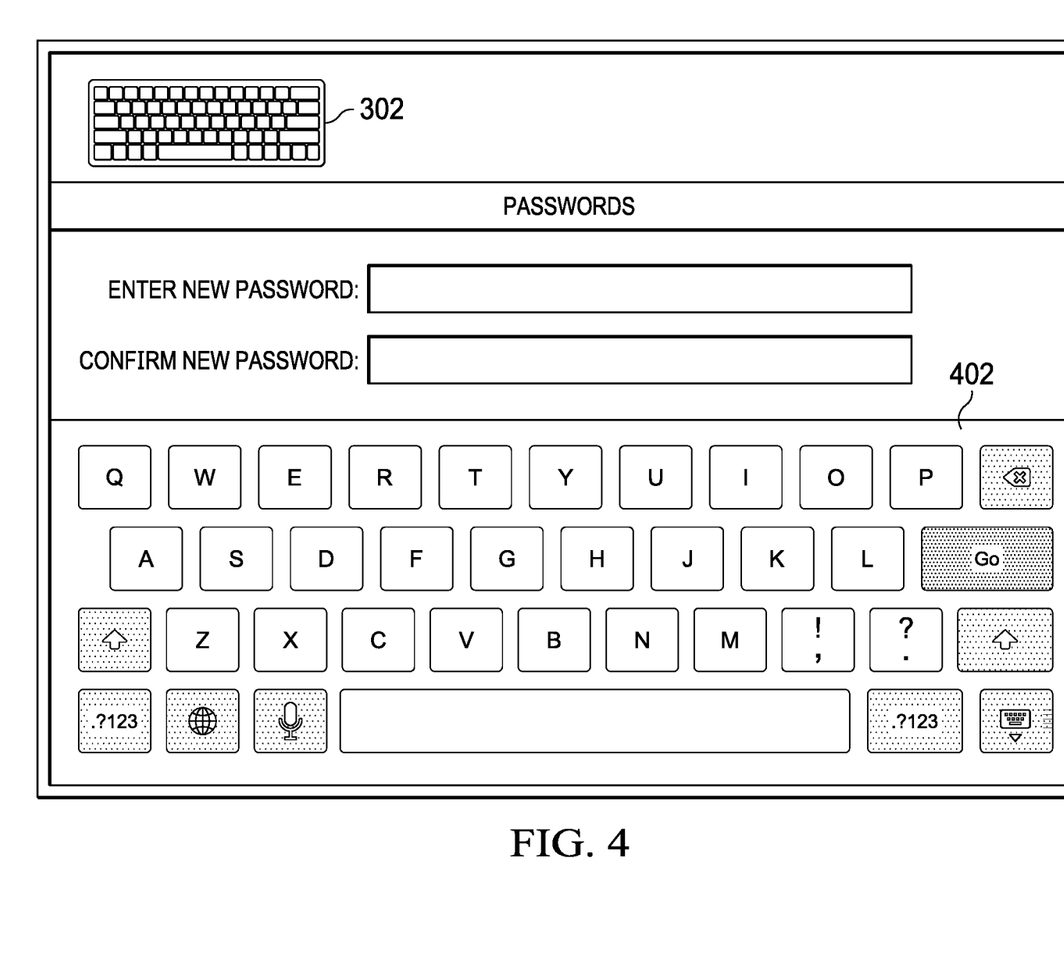
FIG. 4 illustrates display of a soft keyboard, in accordance with embodiments of the present disclosure.

At step 216, soft keyboard driver 114 may cause display of a soft keyboard to display device 122. For example, as shown in FIG. 4, soft keyboard driver 114 may cause display of soft keyboard 402 as an overlay to graphical or alphanumerical information displayed to display device 122, which may allow a user to type or otherwise enter information via virtual keys of soft keyboard 402. In some embodiments, steps 212 and 214 may not be present, and step 216 may occur in response to a determination to enable soft keyboard functionality at step 210. Further, in some embodiments, soft keyboard driver 114 may cause soft keyboard icon 302 to be a toggle, in which case a user may toggle between displaying soft keyboard 402 and hiding soft keyboard 402, and soft keyboard driver 114 may cause such displaying of soft keyboard 402 and hiding of soft keyboard 402 in response to user interaction with soft keyboard icon 302. After completion of step 216, method 200 may proceed again to step 208.

At step 218, soft keyboard driver 114 may exit and BIOS 110 may continue to complete boot of information handling system 102. After completion of step 218, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
    a processor;
    a display device communicatively coupled to the processor; and
    a basic input/output system (BIOS) communicatively coupled to the processor and configured to cause the processor to, during a pre-boot environment of the information handling system:
        register a soft keyboard driver, configured to analyze a system context of information handling system and determine whether to enable soft keyboard functionality, with a consplitter driver configured to handle user I/O interactions during the pre-boot environment;
        collect contextual information indicative of the system context, wherein the contextual information includes information indicative of whether the information handling system has experienced a boot failure during a recent boot attempt;
        based on the contextual information, determine, by the soft keyboard driver, whether to enable soft keyboard functionality; and
        responsive to a determination to enable soft keyboard functionality, cause display of an interactive soft keyboard icon to the display device during the pre-boot environment.

2. The information handling system of claim 1, wherein the interactive soft keyboard icon enables entry of information in response to user interaction with the soft keyboard icon.

3. The information handling system of claim 1, wherein the contextual information comprises information indicative of whether a physical keyboard is communicatively coupled to an input/output subsystem of the information handling system.

4. The information handling system of claim 1, wherein the contextual information comprises information indicative of whether any input/output errors have been detected in connection with execution of the BIOS.

5. The information handling system of claim 1, wherein the contextual information comprises information indicative of whether a process executing on the processor is presently seeking user input.

6. The information handling system of claim 1, wherein the contextual information comprises information indicative of whether user presence detection logic of the information handling system detects the presence of a user at the information handling system.

7. A method comprising, in a basic input/output system (BIOS) of an information handling system during a pre-boot environment of the information handling system:
registering a soft keyboard driver, configured to analyze a system context of information handling system and determine whether to enable soft keyboard functionality, with a consplitter driver configured to handle user I/O interactions during the pre-boot environment;
collecting contextual information indicative of the system context, wherein the contextual information includes information indicative of whether the information handling system has experienced a boot failure during a recent boot attempt;
based on the contextual information, determining, by the soft keyboard driver, whether to enable soft keyboard functionality; and
responsive to a determination to enable soft keyboard functionality, causing display of an interactive soft keyboard icon to a display device of the information handling system during the pre-boot environment.

8. The method of claim 7, wherein the interactive soft keyboard icon enables entry of information in response to user interaction with the soft keyboard icon.

9. The method of claim 7, wherein the contextual information comprises information indicative of whether a physical keyboard is communicatively coupled to an input/output subsystem of the information handling system.

10. The method of claim 7, wherein the contextual information comprises information indicative of whether any input/output errors have been detected in connection with execution of the BIOS.

11. The method of claim 7, wherein the contextual information comprises information indicative of whether a process executing on the processor is presently seeking user input.

12. The method of claim 7, wherein the contextual information comprises information indicative of whether user presence detection logic of the information handling system detects the presence of a user at the information handling system.

13. An article of manufacture comprising:
a non-transitory computer readable medium; and
computer-executable instructions carried on the computer readable medium, the instructions readable by a processor, the instructions, when read and executed, for causing the processor to, in a basic input/output system (BIOS) of an information handling system during a pre-boot environment of the information handling system:
register a soft keyboard driver, configured to analyze a system context of information handling system and determine whether to enable soft keyboard functionality, with a consplitter driver configured to handle user I/O interactions during the pre-boot environment;
collect contextual information indicative of the system context, wherein the contextual information includes information indicative of whether the information handling system has experienced a boot failure during a recent boot attempt;
based on the contextual information, determine, by the soft keyboard driver, whether to enable soft keyboard functionality; and
responsive to a determination to enable soft keyboard functionality, cause display of an interactive soft keyboard icon to the display device during the pre-boot environment.

14. The article of claim 13, wherein the interactive soft keyboard icon enables entry of information in response to user interaction with the soft keyboard icon.

15. The article of claim 13, wherein the contextual information comprises information indicative of whether a physical keyboard is communicatively coupled to an input/output subsystem of the information handling system.

16. The article of claim 13, wherein the contextual information comprises information indicative of whether any input/output errors have been detected in connection with execution of the BIOS.

17. The article of claim 13, wherein the contextual information comprises information indicative of whether a process executing on the processor is presently seeking user input.

18. The article of claim 13, wherein the contextual information comprises information indicative of whether user presence detection logic of the information handling system detects the presence of a user at the information handling system.

* * * * *